US010982400B2

(12) United States Patent
Rodriguez Larreta et al.

(10) Patent No.: US 10,982,400 B2
(45) Date of Patent: Apr. 20, 2021

(54) STRUCTURE FOR AN AQUATIC SPACE AND METHOD FOR CONSERVING LARGE BODIES OF WATER

(71) Applicants: Miguel Rodriguez Larreta, Buenos Aires (AR); Luis Maria Chiodo, Buenos Aires (AR)

(72) Inventors: Miguel Rodriguez Larreta, Buenos Aires (AR); Luis Maria Chiodo, Buenos Aires (AR)

( * ) Notice: Subject to any disclaimer, the term of this patent is extended or adjusted under 35 U.S.C. 154(b) by 0 days.

(21) Appl. No.: 16/462,600

(22) PCT Filed: Mar. 24, 2017

(86) PCT No.: PCT/CL2017/050016
§ 371 (c)(1),
(2) Date: May 21, 2019

(87) PCT Pub. No.: WO2018/090154
PCT Pub. Date: May 24, 2018

(65) Prior Publication Data
US 2020/0063388 A1 Feb. 27, 2020

(30) Foreign Application Priority Data
Nov. 21, 2016 (AR) .............................. 20160103637

(51) Int. Cl.
*E02B 1/00* (2006.01)
*A01K 61/20* (2017.01)
(Continued)

(52) U.S. Cl.
CPC ................ *E02B 1/00* (2013.01); *A01G 33/00* (2013.01); *A01K 61/00* (2013.01); *A01K 61/20* (2017.01);
(Continued)

(58) Field of Classification Search
CPC ......... E02B 1/00; A01K 63/045; A01K 61/00; A01K 63/042; A01K 61/20; C02F 1/38;
(Continued)

(56) References Cited

U.S. PATENT DOCUMENTS 5,087,353 A    2/1992 Todd et al.
7,037,436 B2 *  5/2006 Use ................... B01D 21/0012
                                                    210/747.3
(Continued)

FOREIGN PATENT DOCUMENTS

CN    105601028    5/2016
WO    WO9521798    8/1995

*Primary Examiner* — Fred Prince
(74) *Attorney, Agent, or Firm* — Defillo & Associates; Evelyn A. Defillo

(57) ABSTRACT

The present invention is a new process for preserving the water of an aquatic body as a supplying source for different human activities such as recreation and amusement, food and ornamentation, by the development of a aquatic space formed by a Open water Lake, a Spa Lake, and a Water Depuration Lake that preserves the water mass by biotransformation and mineralization that allow reducing the concentration of carbon, nitrogen and phosphorous, generating clean and transparent water without the use of large amounts of chemicals and complex filtrate systems.

8 Claims, 3 Drawing Sheets

(51) Int. Cl.
*A01G 33/00* (2006.01)
*A01K 61/00* (2017.01)
*A01K 63/04* (2006.01)
*C02F 1/00* (2006.01)
*C02F 1/38* (2006.01)
*C02F 3/32* (2006.01)
*C02F 103/00* (2006.01)
*C02F 103/42* (2006.01)

(52) U.S. Cl.
CPC .......... *A01K 63/042* (2013.01); *A01K 63/045* (2013.01); *C02F 1/004* (2013.01); *C02F 1/38* (2013.01); *C02F 3/327* (2013.01); *C02F 2103/007* (2013.01); *C02F 2103/42* (2013.01)

(58) Field of Classification Search
CPC .... C02F 3/327; C02F 1/004; C02F 2103/007; C02F 2103/42; A01G 33/00
USPC ............ 210/602, 747.2, 747.3, 747.5, 747.7, 210/170.03, 170.07, 170.09, 776
See application file for complete search history.

(56) References Cited

U.S. PATENT DOCUMENTS

| | | |
|---|---|---|
| 7,361,268 B2 | 4/2008 | Ogden |
| 9,611,635 B1* | 4/2017 | Pandya .................. C02F 1/004 |
| 2014/0124420 A1* | 5/2014 | Kim ........................ C02F 3/327 |
| | | 210/96.1 |
| 2014/0332472 A1 | 11/2014 | Fishman Torres |
| 2015/0305313 A1* | 10/2015 | Licamele ............... A01G 22/15 |
| | | 119/204 |

* cited by examiner

STRUCTURE FOR AN AQUATIC SPACE AND METHOD FOR CONSERVING LARGE BODIES OF WATER

CROSS REFERENCE TO RELATED APPLICATION

This application is a national stage entry of PCT/CL2017/050016 filed Mar. 24, 2017, under the International Convention and claiming priority over Argentinean application No. 20160103637 filed Nov. 21, 2016.

FIELD OF THE INVENTION

The present invention relates to the technical field of biological treatments of water, in particular, it refers to a new process for preserving the water of a water body as a supplying source for different human activities such as recreation and amusement, feeding and ornamentation by means of the development of an aquatic space formed by an Open Water Lake, a Spa Lake and a Water Purification Lake.

The aquatic space preserves the mass of water by means of processes of biotransformation and mineralization that allow reducing the concentration of carbon, nitrogen and phosphorus generating clean and transparent water without the use of large amounts of chemicals and complex filtering systems.

DESCRIPTION OF PRIOR ART

In the last years, the tendency that exists at global level regarding the search for housing spaces in contact with water and green in cities has been consolidated.

The city of Buenos Aires experiences an exponential growth in this preference that aims at the accomplishment of nautical activities, to the visual enjoyment and to the recreational contact with the water.

Channels, lagoons, artificial lakes and beaches are consolidated as the housing proposals where the relationship with water—in different forms and dimensions—plays a fundamental role.

However, these artificial water masses suffer the progressive deterioration of water quality and then of their native biotic diversity and their potential as a supplying source of water for different human activities.

When the waters of a lake or pond are enriched with nutrients at a faster rate than elimination, substantial changes occur in the ecological equilibrium of the system.

The eutrophication is an increase in the entry of nutrients into the aquatic system, mainly composed of nitrogen and phosphorus, which produces an increase in the growth of living beings of the primary phase that live in the system.

One of the visible effects of this phenomenon is the green color in water, product of the massive growth of microalgae, some of which produce toxins that affect both the icthyofauna and the human beings.

The excessive contribution of nutrients produces a high proliferation of these algae and aquatic plants. When they die, they are decomposed by bacteria in aerobic processes that consume oxygen. When oxygen decreases, many organic wastes are deposited in the bottom part, increasing the sediments and processes that increase turbidity, bad odors, and deteriorate the physicochemical and sanitary quality of the water.

Thus, its potential as a supplying source of water for different human activities is considerably reduced.

Therefore, it is very important that the amount of nutrients such as nitrogen and phosphorus contained in the aquatic ecosystem does not exceed the self-purification capacity to maintain equilibrium.

For this, different techniques are used, such as aeration systems to increase oxygen levels, algaecides and herbicides to control the excessive proliferation of algae and aquatic plants, odorizers to improve the aesthetic aspect, the mechanical elimination of algae and aquatic plants, the use of dredgers to reduce the amount of sediment, clarifying agents to reduce turbidity, etc.

However, achieving an ecological balance between different species is not enough to convert the body of water into a supplying source of water suitable for different human activities.

For this purpose, it is necessary to eliminate organisms that can affect human health and other impurities from the body of water.

In the case of swimming pools, filtration systems are used to keep the water transparent and suitable for bathing. In addition, oxidants of organic matter, disinfectants, algaecides and, finally, clarifiers are used to maintain the aesthetic and sanitary conditions.

But the maintenance of large bodies of water using filtration and disinfection technologies similar to swimming pools for recreational use is largely unlikely due to the high cost of construction and installation and the operating costs involved.

Among the developed solutions, there are the processes of treatment of large volumes of water, contained in the patents of invention which are developed below.

Patent applications JP4115008 and JP7310311 protect artificial ponds connected to the sea, which target is the purification of seawater.

The system allows water to enter the pond, where the water follows a path specially designed to eliminate pollutants or the water is carried to a purification plant to be returned to the sea. Clearly, these Japanese inventions have no relation to the pond type that it is wished to protect in this application.

Patent application FR2740493 protects a pool or an artificial lake built with a flexible bottom.

The invention includes a drainage system and injectors around the edge that allow the diffusion of a liquid to the drainage system. The analyzed invention has no relation with the artificial pond or the process wished to protect in this application.

Patent application JP59222294 protects a purification process for river and lake water to eliminate N, P, BOD (biological oxygen demand), etc., which involves pumping the water through a bed filled with certain mineral. The Japanese invention allows the cleaning of pond water, but based on the pumping of water through a packed bed, which is equivalent to filtering the liquid. Therefore, the Japanese invention has no relation to the technology described in this application.

Patent Application CN1256250 protects a process of water purification including microflocculation with an inorganic flocculant with high molecular weight and direct filtration of the deep bed. The analyzed process corresponds to an assisted flocculation with faster and more efficient results, but in no case affects the novelty or the inventiveness of the process of the present invention.

From the analysis of the above documents, it can be concluded that there are no similar processes to the one intended to be protected, which reduces the concentration of carbon, nitrogen and phosphorus in large bodies or volumes of water to preserve them as a supplying source for different human activities as the recreation, feeding or ornamentation, with the suitable chemical, physical, and biological characteristics for such activities.

In the process of the present invention, the conventional filtration step has been substituted and the results are achieved from the biochemical activity of the microorganisms; the supply of oxygen from the plant component in interaction with the support medium or petrous aggregate, which functions as a support for both the microorganisms and the plant component, in addition to functioning as filtering material.

Altogether, these elements eliminate dissolved and suspended materials in the wastewater and biodegrade the organic materials until they are mineralized.

Its design allows maintaining and increasing the aesthetics of the landscape and provides conditions for the development and preservation of wildlife, as they provide a habitat for different types of organisms.

Cleaning the surface of the water of the Lake Spa is achieved by generating a displacement of surface water containing impurities and surface oils by means of injecting inlet water and evacuating said water through skimmers (surface slots and landfills) located in the structure.

SUMMARY OF THE INVENTION

The main feature of the present invention is that it reduces the concentration of carbon, nitrogen and phosphorus in large bodies or volumes of water to preserve them as a supplying source for different human activities such as recreation, food or ornamentation, with the suitable chemical, physical, biological characteristics for such activities.

Another feature of the present invention is to keep the naturally transparent water and filtered it to generate higher transparency.

Another more feature of the present invention is to avoid the use of large amounts of chemicals and complex filtration systems to maintain large bodies of water and to obtain the desired result by means of the biological treatment of the water that allows maintaining the suitable chemical, physical, and biological characteristics for human activities.

It is also a characteristic of the present application the low demand for fresh water since it has to be filled once and the natural filtration system allows keeping the values.

It is also another characteristic of the present invention the design that allows maintaining and increasing the aesthetics of the landscape and provides conditions for the development and preservation of wildlife since they provide a habitat for different types of organisms.

It is also another characteristic of the present invention the provision of a construction and maintenance system much more friendly to the environment than those systems already existing on the market.

These and other features and advantages of the invention will be understood and appreciated upon reading the following description of the accompanying figures.

DETAILED DESCRIPTION OF THE INVENTION

Figure 1:
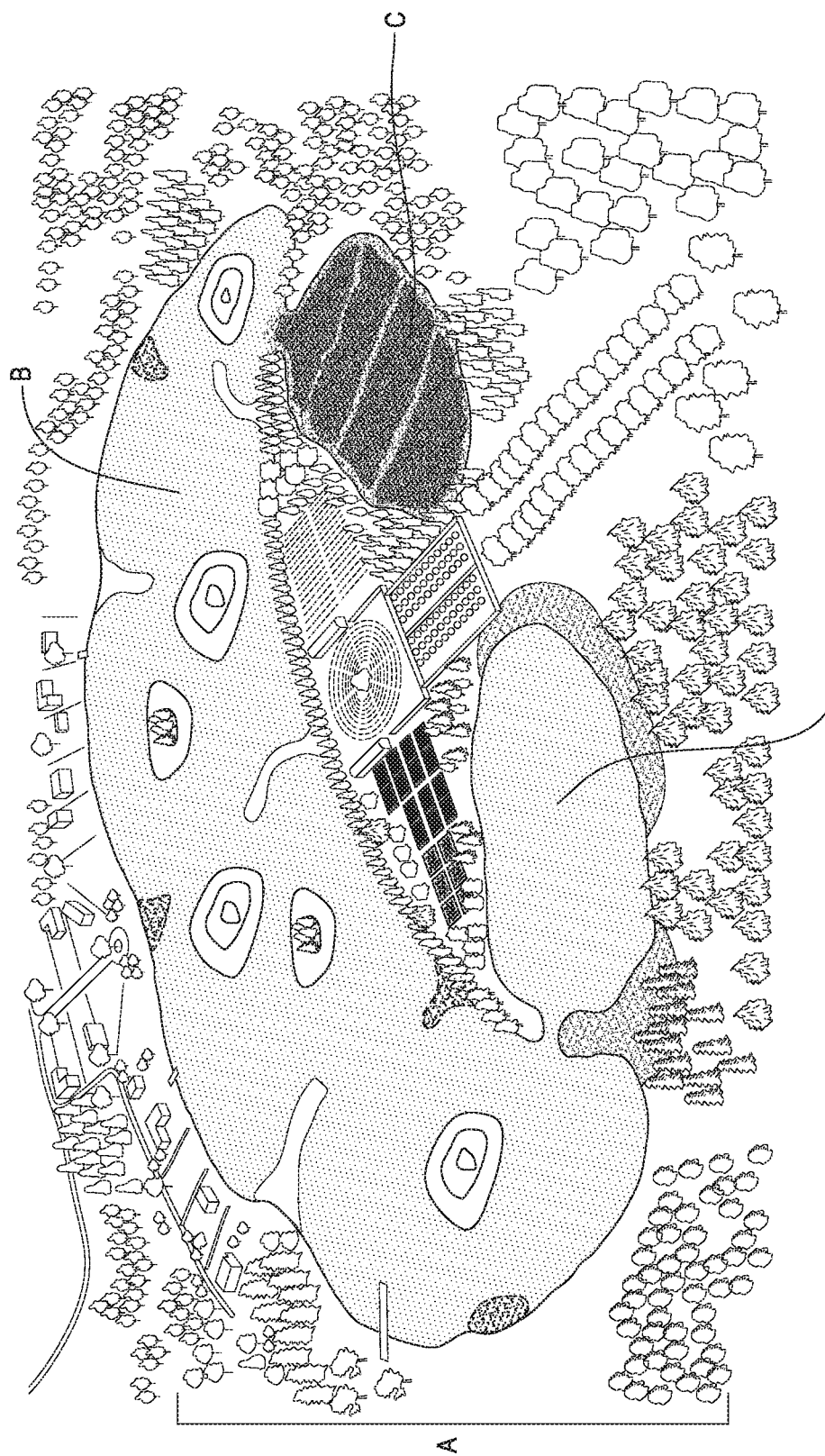
FIG. 1: It shows a top view of the aquatic space formed by an Open Water Lake, a Spa Lake and a Water Purification Lake.

This invention comprises a process that reduces the concentration of carbon, nitrogen and phosphorus in large bodies or volumes of water to preserve them as a supplying source for different human activities such as recreation, feeding or ornamentation, with the suitable chemical, physical, biological characteristics for such activities.

The present invention also discloses a structure of the water space to implement the preservation process in large volumes of water.

The preservation process described in the present invention comprises, in a first step, assembling a structure comprising three systems: an Open Water Lake, a Spa Lake and a Treatment Lake allowing water treatment by biotransformation and mineralization processes of large volumes of water, such as lakes or artificial ponds, to obtain the desired aesthetic and sanitary results.

The process has a great advantage respect of the prior art in that the desired chemical, physical, and biological characteristics are achieved without the need for a filtration system or the addition of large quantities of chemical products, but are achieved from the biochemical activity of the microorganisms; the oxygen from the plant component in interaction with the support means or petrous aggregate, which functions as support for both microorganisms and for plant component, and also functions as filter material.

Altogether, these elements eliminate dissolved and suspended materials in the wastewater and biodegrade the organic materials until they are mineralized.

Its design allows maintaining and increasing the aesthetics of the landscape and provides conditions for the development and preservation of wildlife since they provide a habitat for different types of organisms.

The process of the invention comprises the following steps or stages:

a. to provide a structure capable of containing a large body of water comprising three systems: an Open Water Lake, a Spa Lake and a Treatment Lake, b. to feed the structure of the step (a) with rainwater or groundwater by gravity or pumping, c. to provide to the system of the Open Water Lake a support means or petrous aggregate preferably functioning as support of the flora consisting of a plurality of selected plants that are able to supply oxygen and nutrients to the system, d. to provide to the Water Treatment Lake a modular type system in which modules are coupled in an array in series. This described system is formed by six modules, a Sedimentation module, a Wet Plant Filter module, a Zooplankton Pond, a Dry Plant Filter module, a Biotreatment Pond and a Final Dry Plant Filter module, and in each one of them flows equal volumes, e. to provide to the system of the Spa Lake a structure with surface and bottom skimmers capable of retaining floating or submerged material. In the deep area, it provides a sediment trap.

f. to generate the circulation of water so that the water to be treated from the Open Water Lake enters in the modules of the system of the Water Treatment Lake coupled with an array in series. The sedimentation module retains the coarse sediments of the effluent flow and flows its waters into the Wet Plant Filter module, which retains nutrients. The derived waters will be collected by the Zooplankton Pond to move then to the Dry Plant Filter consisting of a deep permeable bed of 1 m of depth whereby the water destined for the Biotreatment Area will circulated. In the Biotreatment Area, by means of compressors, bubble streams will be produced to oxygenate the water. Bacteria preferably that consume organic material are added periodically. The water of the Biotreatment module is moved to the Final Dry Plant Filter that is formed by emergent rooted hydrophyte vegetation. The Final Dry Filter delivers the water to the Spa Lake.

g. to generate a displacement of water from the surface of the Spa Lake that contains impurities and oils by means of a current generated by the injection of fresh water through the piping systems of said structure, towards surface and bottom skimmers capable of retain floating or submerged material.

Each step of the process for implementing and maintaining large bodies of water is detailed below separately, with the understanding that each step is included within the scope of the present invention.

In step (a), a structure is provided for the aquatic space capable of containing a large body of water larger than one hectare with elements that allow its treatment and the functions required to obtain the desired chemical, physical, and biological characteristics from the biochemical activity of microorganisms; the oxygen supply coming from the plant component and the interaction with the support medium or petrous aggregate.

Altogether, these elements eliminate dissolved and suspended materials in the wastewater and biodegrade the organic materials until they are mineralized.

The design of this structure allows maintaining and increasing the aesthetics of the landscape and provides conditions for the development and preservation of wildlife, as they provide a habitat for different types of organisms.

With reference to FIG. 1, the structure of step (a) comprises three systems: an Open Water Lake (B), a Spa Lake (D) and Treatment Lake (C).

The system of the Open Water Lake (B) optimizes the water purification processes.

Figure 2:
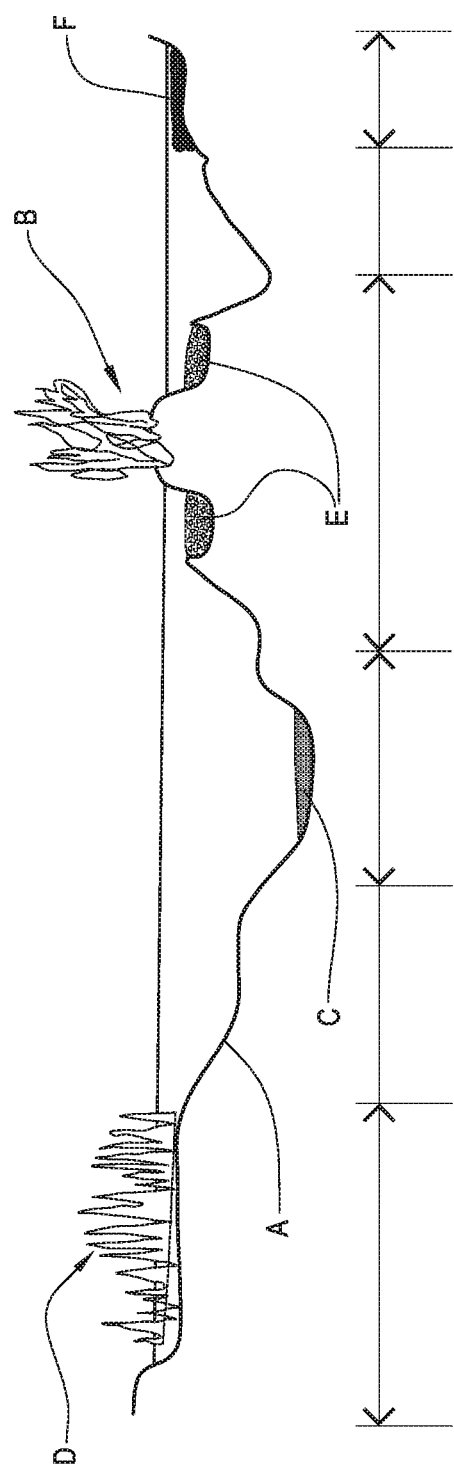
FIG. 2: It shows a cross section of the Open Water Lake.

As described in FIG. 2, it has a depth of more than 0.5 m, preferably between 2 and 5 m and its coasts are preferred with a gentle slope (A) in the first 5 to 10 m with a fall of the type 5 to 1, that is to say it will gain 1 m of depth every 5 m longitudinal.

The structure of the Open Water Lake is composed of Small Islands (B), Sedimentation Wells (C) and Green Submerged Breakwaters (D).

The natural ground is the one formed by the Small Islands (B) surrounded by a shallow perimeter that has the environmental function equivalent to a Reef (E) in terms of water purification and species diversity.

The Reef (E) retains sediments and processes organic material by means of macrophytes and periphyton.

The Reef (E) is a ring that surrounds the Small Islands with a width preferably of 5 to 15 m. Its outer edge to open waters will be protected by an elevation of 0.30 m that will give the shape of a soup plate in which center the micro-island will be.

The depth of water in the Reef is preferred from 0.50 to 1.00 m. The inside of the plate will be colonized by aquatic plants. In some sectors, there will be stone mounds. The Stone Mounds (F) are stone beaches (submerged) characterized by spaces of refuge between the medium or large stones.

On its surface, the Small Island (B) will be densely populated by vegetation that will shelter aquatic and terrestrial birds and other organisms. The aquatic birds are particularly important, although the plant varieties of small islands should attract insects and butterflies since species diversity is essential for the whole project.

In the bottom of the Open Water Lake, some Sedimentation Wells (C) of 10 m of radius and 2 m of depth specially designed for retention of medium and coarse sediment will be placed.

Green Submerged Breakwaters (D) will enter in the lake from the coasts. The ground of these structures is 0.40-0.60 m below the water surface and is colonized by rushes or equivalent species. These structures will create backwaters and orient the lake currents, both superficial and deep.

These rushes also have to retain sediments and act as natural filters improving the quality of the water.

Between these green breakwaters and the aquatic vegetation of the coast, the Open Water Lake will reach a density of aquatic vegetation equivalent to 40% of its perimeter.

Figure 3:
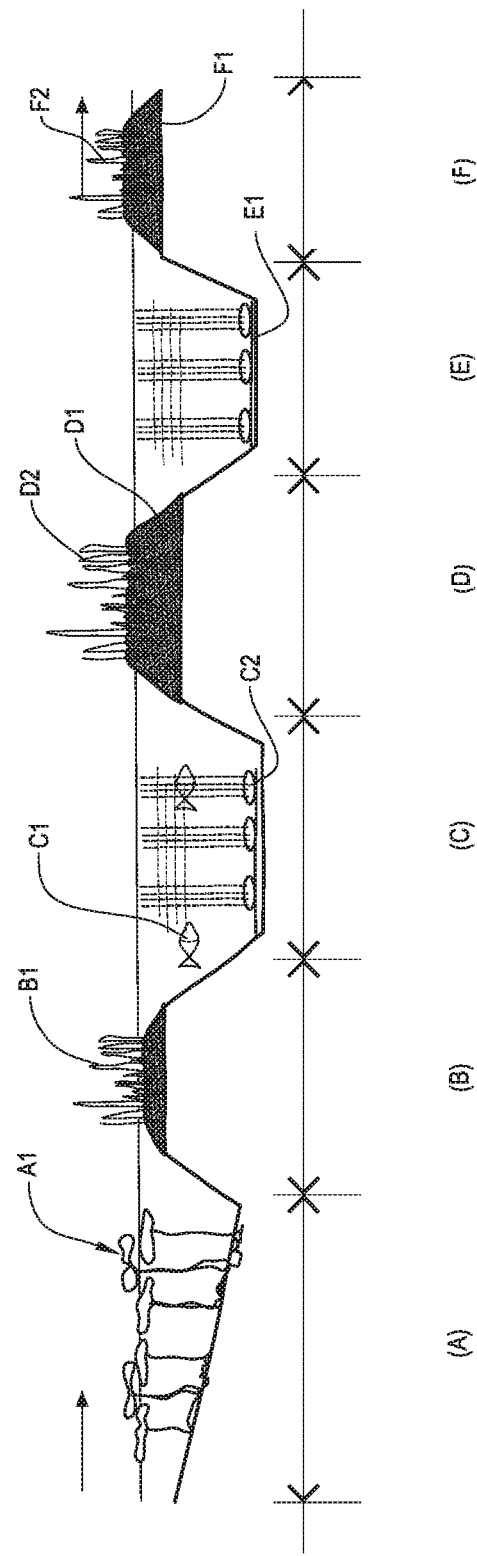
FIG. 3: It shows a cross section of the Water Treatment Lake.

FIG. 3 describes the system of the Treatment Water that develops a large part of the water purification process.

A depth of more than 0.5 m, preferably between 2 and 5 m, is described.

The structure of the Water Treatment Lake comprises a module of Sedimentation (A), a module of the Wet Plant Filter (B), a Zooplankton Pond (C), a module of Dry Plant Filter (D), a Biotreatment Pond (E) and a module of Dry Plant Filter (F).

In the module of sedimentation (A), an average depth of between 0.60 to 1.50 m is preferred.

The dominant vegetation in this module is of the lotus type (*Nymphaea* Sp) (A1) that allows minimizing the movement of water by the wind improving the sedimentation, generating a shadow effect in the warm months that inhibits the growth of invasive aquatic vegetation and finally carrying out a first treatment of the sediments by absorbing nutrients and interacting with the same.

The extraction of the sediments in the container is mechanical. This can be necessary from the first decade of use.

The module of the Wet Plant Filter (B) is preferably at an average depth of between 0.60 to 0.80 m and the dominant vegetation in this module is of the XXXXX type (B1).

The Zooplankton Pond (C) carries out the production of zooplankton in general and the production of *Daphnia* in particular.

In the module of filtrate by zooplankton, a purely piscivorous fish population (C1) is introduced to regulate possible zooplankton predators.

The area will be provided with a very efficient oxygenation by compressors and diffusers of bubbles (C2) and luminosity to stimulate the cycle of phyto and zooplankton.

To optimize the growth of zooplankton, water treatments will be carried out to increase the alkaline reserve and improve it by periodic liming.

The module of the Dry Plant Filter (D) comprises a deep permeable bed of 1 m depth where the water has to circulate to the Biotreatment Area (E). The water surface must have a height in this sector of 0.80 m (D1) so it will circulate between the bed without being seen on the surface. The bed must be formed with boulder or stone.

In the module, rooted aquatic plants (D2) (like rushes) are planted so their roots have contact with the water and retain nutrients. In addition to the biological filtration carried out by the plants, the stone bed retains sediments.

The Biotreatment Pond (E) is a sector of open waters, preferably of 1.50 m depth.

By means of compressors (E1), currents of bubbles are produced for oxygenating water obtaining more oxygenated water.

The last module of this space is a Final Dry Plant Filter (F).

This last filter of 1 m depth (F1) must make the water circulate to the Spa Lake. The water surface must have a height in this sector of 0.80 m so it will circulate between the bed without being seen on the surface. The bed must be formed with boulder or stone.

In the area, rooted aquatic plants (F2) (like rushes) are planted so that their roots have contact with the water and retain nutrients. In addition to the biological filtration carried out by the plants, the stone bed retains sediments.

The last of the systems of the structure described is the Spa Lake.

Figure 4:
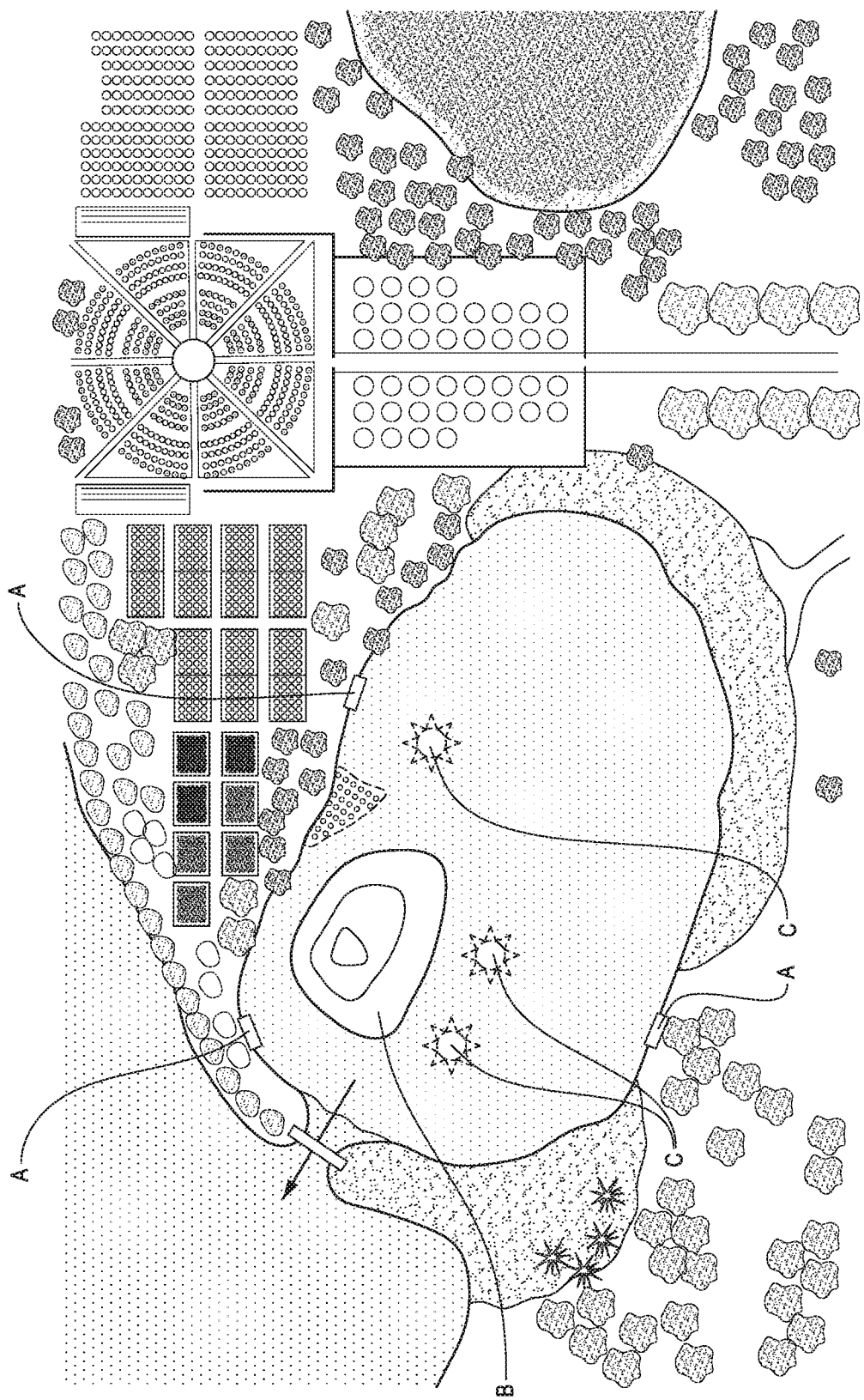
FIG. 4: It shows a top view of the Spa Lake.

Referring to FIG. 4, the Spa Lake is described. The same receives the water treated by the Treatment Lake and preferentially drains into the Open Water Lake.

The system is completed with suction grooves—skimmers—(A) of surface and bottom capable of retaining floating or submerged material. In the deep area, there is a sediment trap (B). To maintain oxygenation, there are compressors (C).

The structure provided in step (a) for the method of the invention also has:

1) a depth of more than 0.5 m, preferably between 2 and 5 m; depth is important to achieve a balanced ecosystem, 2) a system of recycling by means of pipes with injectors that allow maintaining the homogeneity of water and avoiding areas of stagnation. This system can be avoided in windy areas.

3) Optionally, the use of particular waste retention or spill prevention devices may be of interest in some cases.

As described, the structure is fundamental to the method of the invention.

In step (b), water with low turbidity is preferred because the process of the present invention does not have a traditional filtration process and the suction device would be ineffective in case of receiving high levels of suspended particles, including organic and inorganic contaminants.

Process

In stage (c), the waters of the Open Water Lake and the Spa Lake enter the Treatment Lake by means of gravity or pumping to the module of Sedimentation, which function is to retain the medium and coarse particles in the water that enters by this pipe.

The module of sedimentation retains the particles with the highest density contained in the water and sends them by pumping to the module of Wet Plant Filters. The accumulated sediments are manually removed.

Once lapsed the 5 to 10 hours of hydraulic residence en the module of sedimentation, the water is conducted to the module of Wet Plant Filters, where the periphyton of the aquatic vegetation is responsible for the removal of organic material, total suspended solids and total dissolved solids, while promoting the biotransformation of ammonia nitrogen (N—NH4) to nitrate nitrogen (N—NO3).

The waters coming from this module will be collected by the Zooplankton Pond, where after the hydraulic residence time, will be sent to the Dry Plant Filter that is formed by vegetation of emergent rooted hydrophyte type, which favors the assimilation of N-NO3-, as well as the incorporation of carbonaceous material to its tissue and the exchange of oxygen in the rhizome zone, for the development of scrubbing microorganisms that mitigate the contaminants in the system.

The water of the Dry Plant Filter is conducted to the module of Biotreatment.

In this module, the inoculation of bacteria is carried out to digest organic material, preferably nitrifying agents, and cooperate with retention of other components of the water to be treated. The amount applied depends on many factors that vary such as, for example: temperature, solar radiation, environmental pollution, rain, storms, usage levels, etc. The amount to be applied is determined by the results of periodic water analysis.

The water of the module of the Biotreatment is conducted to the Final Dry Plant Filter which function is to conduct a re-treatment of the previous treatment and to decrease the concentration of the aforementioned contaminants, until the values indicated as water suitable for human recreational use with immersion.

The Final Dry Filter delivers the water to the Spa Lake.

Oxygenation and Thermocline

By means of compressors, currents of bubbles must be produced for oxygenating the water and reducing the thermocline in the aquatic spaces in which it tends to form.

The structure must have fresh water supply pipes that cause the movement of superficial water thus removing floating impurities and oils through the skimmers.

It thus being particularly described and determined the nature of the present invention and how the same is to be put into practice, as stated claim exclusive right and property:

The invention claimed is:

1. A process for developing and preserving large bodies of water, the process comprising:

providing a structure capable of containing a large body of water, the structure including an open water lake system, a spa lake system, and a water treatment lake system;

feeding the structure with rainwater and groundwater;

providing the open water lake system with a supporting medium or petrous aggregate that functions as a support for flora, the supporting medium or petrous aggregate includes a plurality of plants that supply oxygen and retaining nutrients to the open water lake system;

providing the water treatment lake system with a modular system including a sedimentation module, a wet plant filter, a zooplankton pond, a dry plant filter, a biotreatment pond, and a final dry plant filter that are coupled with an array in series;

providing the spa lake system with surface skimmers capable of retaining floating material and a sediment trap in a deep area;

generating a circulation of water so that the water to be treated at the open water lake system enters to the water treatment lake system to retain coarse sediments of an effluent flow in the sedimentation module and to pour the water into the wet plant filter in which the nutrients are retained;

collecting water from the zooplankton pond to direct the water to the dry plant filter;

directing the waters to a biotreatment pond where the water is oxygenated and to periodically adding organic material consuming bacteria;

sending the water from the biotreatment plant to the final dry plant filter that retains nutrients and sediments; returning the filtered water to the spa lake system;

generating displacement of water from the spa lake system that contains impurities and oils by a current generated by the injection of fresh water through a piping systems of the structure, towards surface and bottom skimmers capable of retaining floating or submerged material.

2. The process according to claim 1, wherein the open water lake system comprises a petrous aggregate as a support for a balanced ecosystem of aquatic organisms including fishes and plants.

3. The process according to claim 1, wherein open water lake system comprises a flora having a plurality of rooted aquatic plants capable of retaining and processing sediments and nutrients.

4. The process according to claim 1, wherein the water treatment lake system comprises a flora having a plurality of *Nymphaea* Sp plants on the sedimentation module, *Daphnia* for the zooplankton pond, and emerging rooted hydrophytes for the final dry plant filter.

5. The process according to claim 1, wherein the water treatment lake system comprises a floor or bed of filtering petrous aggregate.

6. The process according to claim 1, wherein the water treatment lake system comprises a fauna including a plurality of piscivorous fishes in equilibrium with a zooplankton.

7. The process according to claim 1, wherein the spa lake system comprises superficial suction grooves—skimmers.

8. The process according to claim 1, the spa lake system comprises a bottom suction groove—skimmers.

\* \* \* \* \*